W. W. BOYKIN.
HAY PRESS.
APPLICATION FILED FEB. 23, 1909.

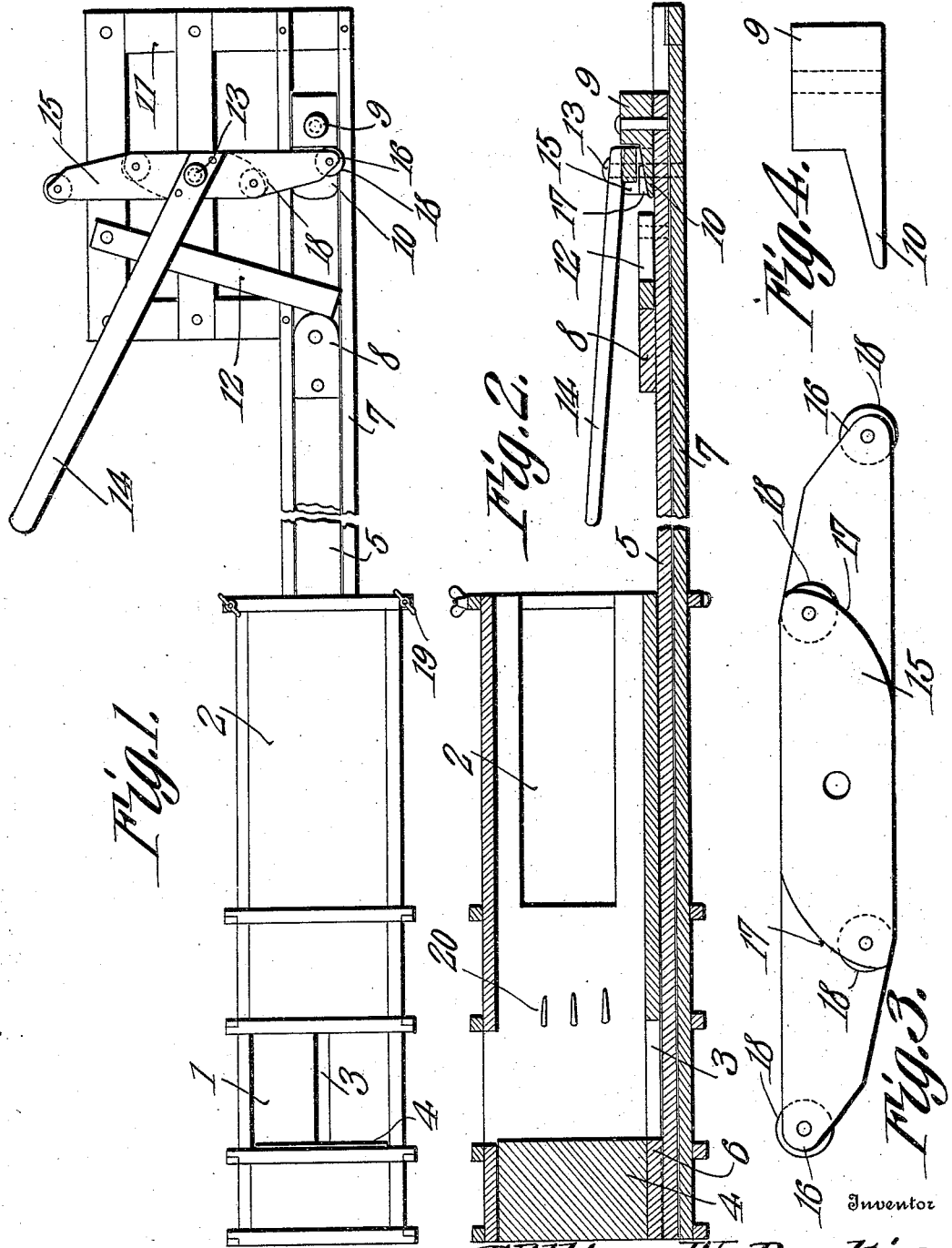

940,669.

Patented Nov. 23, 1909.
2 SHEETS—SHEET 2.

Witnesses

Inventor
William W. Boykin.
By C. A. Snow & Co.
Attorneys

UNITED STATES PATENT OFFICE.

WILLIAM W. BOYKIN, OF ELM CITY, NORTH CAROLINA, ASSIGNOR OF ONE-HALF TO ANGUS B. CAMERON, OF ELM CITY, NORTH CAROLINA.

HAY-PRESS.

940,669.  Specification of Letters Patent.  Patented Nov. 23, 1909.

Application filed February 23, 1909. Serial No. 479,349.

*To all whom it may concern:*

Be it known that I, WILLIAM W. BOYKIN, a citizen of the United States, residing at Elm City, in the county of Wilson and State of North Carolina, have invented a new and useful Hay-Press of which the following is a specification.

This invention has relation to hay presses and it consists in the novel construction and arrangement of its parts as hereinafter shown and described.

The object of the invention is to provide a baling press for hay and other material which consists of a baling box in which is mounted a plunger for reciprocation, means being connected with the plunger for drawing or pulling the same upon its compression stroke, and for pushing the same upon its retraction stroke.

A frame for supporting a sweep mechanism is positively fixed with relation to the baling box, and supports means for actuating the plunger in its compression and retraction strokes, which means is operatively connected with the sweep mounted upon the said sweep frame.

Figure 7:
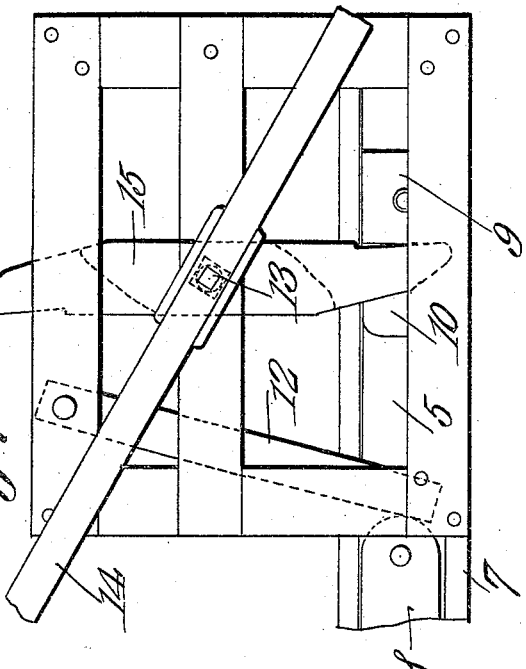
Figure 8:
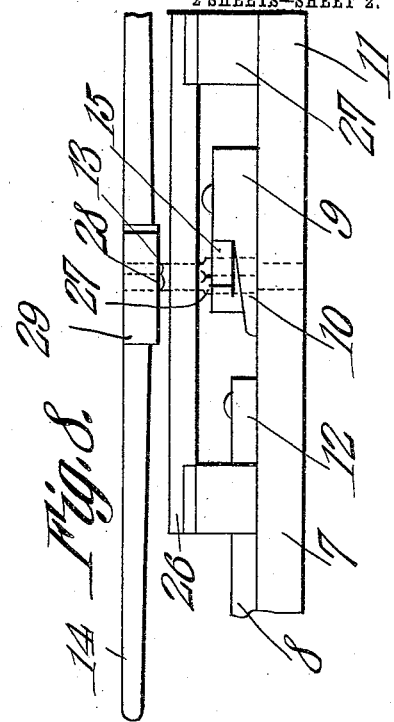
Figure 5:
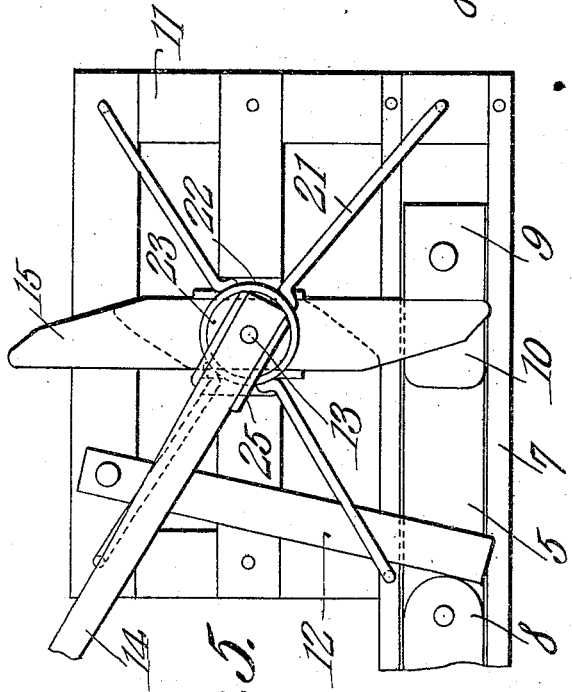
Figure 6:
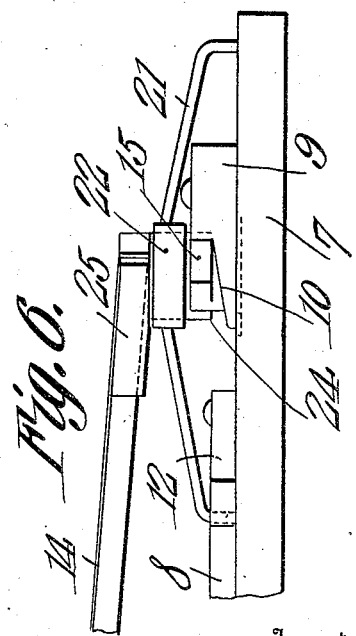

In the accompanying drawings:—Figure 1 is a top plan view of the press. Fig. 2 is a longitudinal sectional view of the same. Fig. 3 is a bottom side view of an arm used upon the sweep shaft of the press. Fig. 4 is a side view of a pivoted lug used upon the press. Fig. 5 is a plan view of a modified form of sweep mechanism which may be used in the press. Fig. 6 is a side elevation of the same. Fig. 7 is a plan view of still another modified form of sweep mechanism. Fig. 8 is a side elevation of the same.

The press consists of the baling box 1, which is continued at one end into the bale chamber 2. The bottom of the box 1 is slotted as at 3, and the plunger 4 is mounted for reciprocation in the box 1 over the slots 3. A bar 5 is mounted for reciprocation under the box 1, and is provided with a rib 6, which projects up into the slots 3, and to the upper side of which the lower side of the plunger 4 is fixed. A guide 7 projects from that end of the box 1 which is continued into the bale chamber 2 and receives the outer portion of the bar 5. A stop 8 is mounted upon the upper side of the outer portion of the bar 5, and a stop 9 is pivotally mounted at the outer extremity of the said bar 5. The stops 8 and 9 are spaced apart, and the stop 9 is provided at the lower edge of its side opposite the adjacent side of the stop 8 with an inclined lug 10.

A sweep frame 11 is fixed to the side of the outer portion of the guide 7, or that portion remote from the end of the bale chamber 2. A lever 12 is fulcrumed at one end to the outer portion of the frame 11 and its opposite end lies against the outer end of the stop 8. A shaft 13 is vertically disposed at the middle of the frame 11 and is journaled for rotation. A sweep 14 is fixed to the upper portion of the shaft 13, and an arm 15 is fixed with relation to the inner portion of the sweep 14 and the upper portion of the shaft 13. The arm 15 is provided with the projecting ends 16 and undercut shoulders 17, one of which is located adjacent each of the ends 16. While the arm 15 is mounted to move in a plane parallel with the upper surface of the frame 11, it is pitched at an acute angle with relation to the longer dimension of the sweep 14. A suitable platform for sustaining a driver may be mounted upon the inner end of the sweep 14 if desired. The ends of the arm 15 and the shoulders 17 may be provided with the friction rollers 18, if such rollers are deemed necessary. The end of the bale chamber 2 may be provided with the usual screw bolts 19 for contracting the end thereof and the sides and the baling box 1 may be provided with the spring fingers 20 for preventing the hay which has been compressed in the baling chamber from following the plunger 4 upon its retraction stroke. As such screw bolts and fingers are devices commonly used upon hay presses, further description thereof is unnecessary.

The operation of the press is as follows:— A draft animal, or a pair of draft animals, are hitched to the end of the sweep 14 and are driven in a circular course, as is usual with such mechanism. As the sweep 14 rotates about the axis of the shaft 13 and the said shaft rotates upon its axis, the arm 15 is rotated and one of the ends 16 of the arm 15 comes in contact with the inner face of the stop 9 and moves the said stop away from the end of the bale chamber 2. The movement on the part of the stop 8 correspondingly moves the bar 5 which in turn pulls the plunger 4 in the box 1 toward the bale chamber 2. Thus the material which has previously been deposited in the box 1 is compressed and forced into the bale chamber 2 in the usual manner. The difference in the present construction over its predecessors is that the plunger in its compression stroke is actuated by a pull rather than by a push. After the stop 8 has been moved to such an extent as to arrive at a point beyond the path of movement of the end 16 of the arm 15, which is in engagement with the same, as above described, the said end 16 of the arm 15 escapes or moves away from the stop 8, but at the same time, the undercut shoulder 17 at the opposite end of the arm 15 comes in contact with the side of the lever 12 and forces the free end of the said lever toward the end of the bale chamber 2. As the free end of the said lever is in contact with the face of the stop 8, the stop 8 is moved toward the bale chamber and the bar 5 is correspondingly moved, which retracts the plunger 4 or moves the same in the opposite direction from that in which it travels when making a compression stroke. The shoulders 17 are spaced at such a distance from the extremities of the ends 16, that as one of the ends 16 escapes the stop 9, the shoulder at the opposite end portion of the arm 15 engages the side of the lever 12. Thus the draft animal or animals are subjected to steady strain, and during the operation of the press there is no time when the sweep is not performing work in moving the plunger. The operation above described which is performed by one end of the arm 15 is performed by the opposite end thereof when it arrives at the stop 9, and, by reason of the fact that the arm 15 is pitched at an acute angle to the longer dimension of the sweep 14, a leverage is gained which facilitates the movement of the plunger in its compression stroke, but which is lost when the plunger is retracted. In view of the fact that when the plunger is in its retractory movement it is not performing any work, the leverage desired to be had when it is performing its compression stroke is not necessary.

An advantage gained by the arrangement of the parts as stated is that as the bale is completed in the chamber 2 and is forced from the delivery end thereof it is engaged by the sweep 14 or single or double trees carried thereby and is brushed to one side by the draft animals. Thus the bale is moved out of the way, and when an operator who is attending to the tying of the bale, is at liberty, he may remove the bale thus brushed out of the way of the press to any desired point.

Figs. 5 to 8 of the drawings illustrate modifications in the detailed structure of the sweep mechanism. The form of sweep mechanism as illustrated in Figs. 5 and 6, consists of a spider 21, which is mounted upon the frame 11, and which is provided at its center with a bearing 22. A barrel 23 is journaled in the bearing 22 and the shaft 13 passes vertically through the said barrel and the end of the sweep 14. The barrel 23 is provided upon its under side with a sleeve 24, which receives the intermediate portion of the arm 15, and the said barrel is provided at its upper end with a sleeve 25, which receives the end of the sweep 14. The barrel and the said sleeves are integral and preferably formed from cast metal, while the other parts, with the exception of the spider, are preferably of wood.

In the form of sweep mechanism as illustrated in Figs. 7 and 8 of the drawings, the shaft 13 is journaled at its lower end in the frame 11, and at its upper end in a superimposed frame 26. The frame 26 is located over the frame 11 and is connected with the same by means of the uprights 27. The said shaft 13 is cylindrical at those parts which are journaled in the frame 11 and the superimposed frame 26, but the said shaft is provided at its intermediate part with a squared or non-circular portion 27, upon which the arm 15 is mounted. The upper end of the said shaft 13 as at 28 is also squared or non-circular, and a sleeve 29 is located on the last said portion of the shaft 13. The sweep 14 is secured in the sleeve 29 and projects beyond the opposite ends of the same, and, to an extent, is counterbalanced. In this form of sweep mechanism the sleeve 29 is preferably of metal, while the other parts, with the exception of the shaft 13, are preferably formed of wood. In both of the forms of the invention as illustrated in Figs. 5 to 8, it will be seen that a brace means is provided for the shaft 13 immediately below the point where the sweep 14 connects therewith, and, consequently, the structure is materially strengthened, and is admirably adapted to withstand the strain to which such devices are subjected.

Having described my invention, what I claim as new, and desire to secure, by Letters Patent, is:—

1. A baling press comprising a baling box, a plunger mounted for reciprocation therein, a bar slidably mounted under the baling box and communicating with the plunger through a slot in the bottom of the box a guide for said bar, said guide being fixed at one end to the baling box, a sweep frame attached to the opposite end portion of the said guide, stops mounted upon the said bar, a sweep mounted upon the sweep frame, and means operated by the sweep for engaging the stops to actuate the bar and plunger.

2. In combination with a baling press having a reciprocating plunger and a reciprocating bar operatively connected therewith, spaced stops mounted upon the bar, a sweep frame located adjacent, a sweep mounted for rotation about an axis upon the sweep frame, an arm fixed to the sweep, a lever pivoted to the sweep frame and having one end engaging one of the stops upon the bar, said arm having a shoulder for engagement with the lever and a projecting end for engagement with that stop opposite the stop with which the said lever is in contact.

3. In combination with a baling press having a reciprocating plunger and a reciprocating bar for operating the same, stops mounted upon the bar, a pivoted lever having a free end in contact with the side of one of the stops, a sweep-actuated arm mounted for rotation about an axis, and having a projecting end adapted to engage that stop opposite the one with which the lever is in engagement, and having shoulders for engagement with the said lever.

4. In combination with a baling press having a reciprocating plunger and a bar for actuating the same, a fixed stop mounted on the bar, a pivoted stop mounted on the bar and spaced from the first said stop, a lever fulcrumed and having its free end in engagement with the fixed stop, an arm mounted for rotation about an axis and having a projecting end for engagement with the pivoted stop, and undercut shoulders for engagement with the said lever.

In testimony that I claim the foregoing as my own, I have hereto affixed my signature in the presence of two witnesses.

WILLIAM W. BOYKIN.

Witnesses:
ANGUS B. CAMERON,
W. H. PRIDYME.